United States Patent Office 3,186,170
Patented June 1, 1965

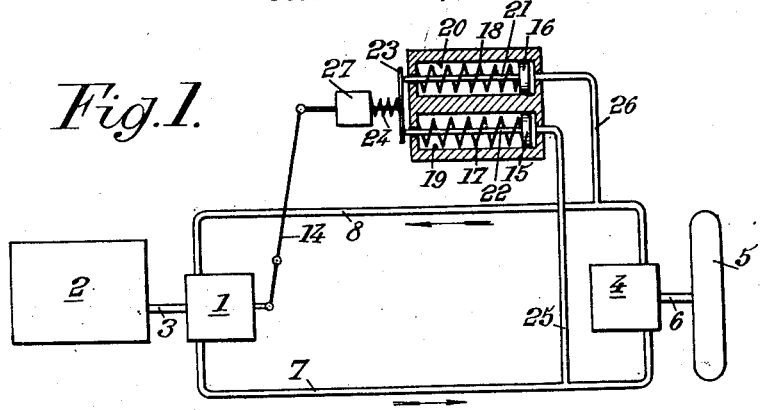
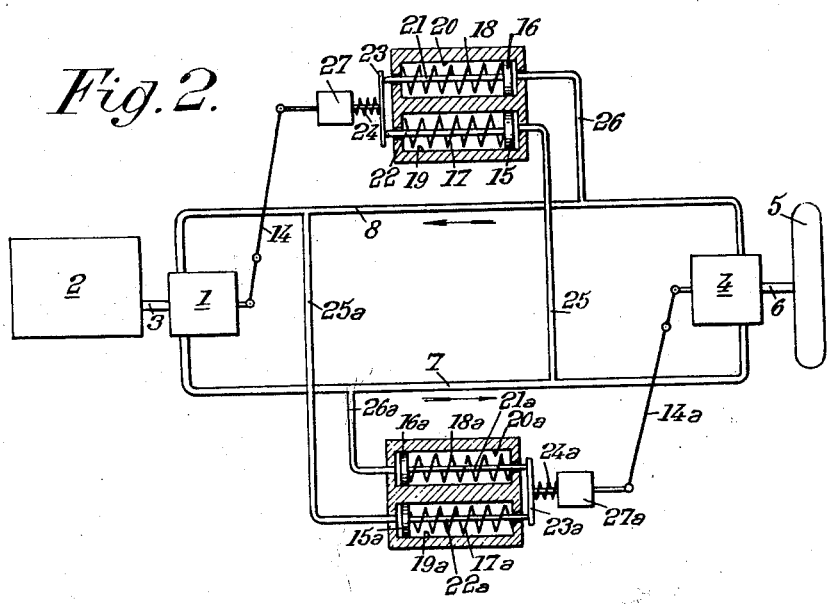
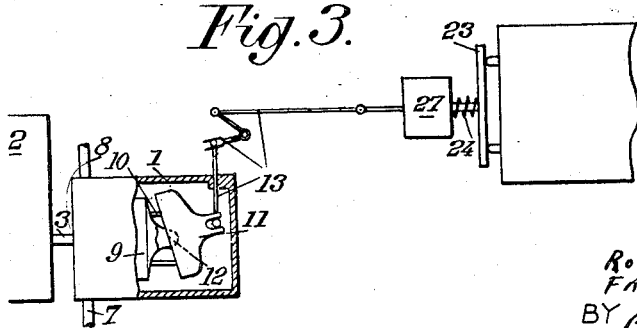

3,186,170
VARIABLE RATIO HYDRAULIC TRANSMISSIONS
Robert Gauthier, Saint-Germain au Mont d'Or, and François Dumas, Villeurbanne, France, assignors to Societe Industrielle Generale de Mecanique Appliquee S.I.G.M.A., Paris, France, a corporation of France
Filed June 24, 1963, Ser. No. 289,965
Claims priority, application France, June 26, 1962, 902,066
2 Claims. (Cl. 60—53)

The present invention relates to hydraulic transmission systems comprising a pump driven by an internal combustion engine, at least one hydraulic motor mechanically coupled with a part to be driven liable to be subjected to external forces independent of the internal combustion engine, two pipes forming a closed circuit between the pump and the hydraulic motor and means for varying the flow rate per revolution of the pump and/or of the hydraulic motor. The invention is more especially, but not exclusively, concerned with hydraulic transmission systems of this kind to be mounted on automobile vehicles, said part to be driven being then a wheel or set of wheels of the vehicle.

It is known that, in such a transmission system, one of said pipes, which will be hereinafter called "first pipe," generally feeds to the inlet of the hydraulic motor the liquid under pressure delivered by the pump, whereas the other pipe, hereinafter called "second pipe," returns to the inlet of the pump the liquid without pressure supplied at the outlet of the hydraulic motor. However, when the external forces acting upon the part to be driven become too high (case of a vehicle running down a slope), the internal combustion engine temporarily acts as a brake, which reverses the respective functions of the pump (which then acts as a hydraulic motor) and of the hydraulic motor (which then acts as a pump), on the one hand, and of the pipes cooperating therewith, on the other hand, the second pipe then containing liquid under pressure. Furthermore, when the part to be driven must move in opposed directions (case of forward and reverse running of an automobile vehicle), the pump may be arranged in such manner as to deliver liquid at will either into the first or into the second pipe so as to drive the hydraulic motor in one direction or in the other. It will therefore be understood that, according to the conditions of operation, both of the pipes may serve to deliver the flow of liquid under pressure.

The object of the present invention is to provide a hydraulic transmission system of this kind such that the flow rate per revolution of the pump and/or of the hydraulic motor automatically assumes the best possible value under all circumstances.

The invention consists chiefly, in hydraulic transmissions of the kind in question, in controlling the flow rate varying means in parallel by means of two movable parts subjected in one direction to the pressures existing in the two pipes respectively and in the other direction to the action of resilient return means which are independent of each other and preferably adjustable.

Preferred embodiments of the present invention will be hereinafter described with reference to the appended drawings, given merely by way of example, and in which:

FIG. 1 diagrammatically shows, partly in section, a hydraulic transmission made according to a first embodiment of the invention;

FIG. 2 is a similar view relating to another embodiment of the invention;

FIG. 3 shows a modification, this view illustrating the pump partly in section.

In the following description, it will be supposed that the invention is applied to the case of a hydraulic transmission for an automobile vehicle.

The transmission system comprises the following elements:

(a) a pump 1 driven by an internal combustion engine 2 (for instance a Diesel engine) through shaft 3;
(b) at least one hydraulic motor 4 mechanically coupled with the wheel 5 of the automobile vehicle through a shaft 6;
(c) a first pipe 7 and a second pipe 8 forming a closed circuit between machines 1 and 4; and
(d) means for varying the flow rate per revolution of pump 1 (FIG. 1) and possibly also that of hydraulic motor 4 (FIG. 2).

The last mentioned means may be made in many different known manners and one of them is diagrammatically shown by FIG. 3. In this case the pump comprises a barrel 9 driven in rotation by shaft 3 and containing several cylinders distributed about the geometrical axis of said shaft 3. In these barrels can move respective pistons, the rods 10 of which bear against a stationary cam 11 which imparts to each of the pistons a reciprocating movement when barrel 9 is rotating. The inclination of cam 11 about a swivel point 12 may be adjusted by means of a rod system 13 (FIG. 3) or 14 (FIGS. 1 and 2), which determines the length of stroke of said pistons and consequently the flow rate per revolution of the pump.

The arrows of FIGS. 1 and 2 show the usual direction of flow of the liquid between machines 1 and 4, that is to say the direction corresponding to the frontward drive of the vehicle. If this vehicle is driven by engine 2, pipe 7 is under pressure and there is no substantial pressure in pipe 8, whereas, if engine 2 is acting as a brake (the vehicle being on a downward slope), pipe 7 is under no substantial pressure and pipe 8 is under pressure. When the vehicle is running backward, the direction of circulation of the liquid is the reverse of that indicated by the arrows.

Now, according to the present invention, means 11, 12 and 13 or 14 are controlled in parallel by two movable members 15 and 16 respectively subjected in one direction (toward the left of FIGS. 1 and 2) to the pressure existing in pipes 7 and 8 and in the opposed direction to the action of resilient return means 17 and 18, which are independent and preferably adjustable.

As shown by FIGS. 1 and 2, movable members 15 and 16 consist of pistons slidable in parallel respective cylinders 19 and 20, the rods 21 and 22 of these pistons projecting from the cylinders and cooperating with a thrust plate 23 urged toward them by a spring 24. Cylinders 19 and 20 communicate with pipes 7 and 8 respectively, through pipes 25 and 26. Advantageously, as shown, they contain springs 17 and 18 located on the side of each of the pistons opposed to that through which liquid is fed from pipes 7 and 8. A force amplifier 27 of any type, preferably a hydraulic one, may be interposed between plate 23 and rod 13 or 14.

In the embodiment of FIG. 1 only pump 1 has a variable flow rate per revolution whereas in the construction of FIG. 2 both pump 1 and hydraulic motor 4 are of this type. The means for adjusting the flow rate cooperating with motor 4 are designated by the same reference numbers as the corresponding means cooperating with pump 1, followed by letter *a*.

The transmission system according to the invention made according to either of the two modifications of FIGS. 1 and 2, works as follows.

If pump 1 delivers liquid under pressure toward motor 4, pipe 7 is generally (frontward drive) subjected to a pressure which varies in accordance with the resistant torque acting upon wheel 5. This pressure acts upon piston 15 and modifies the flow rate of pump 1, in accordance with the resistance of spring 17, through amplifier device 27. If the resistant torque increases, the flow rate per revolution of pump 1 decreases and vice-versa.

It may also happen that, when pump 1 delivers liquid under pressure toward motor 4, it is pipe 8 which is placed under pressure (backward running of the vehicle), the circulation of the liquid taking place in the direction opposed to that of the arrows. The operation is the same as above described with the difference that in this case piston 16 and spring 18 are brought into play.

Finally, when engine 1 is used as a brake, machine 4 works as a pump and delivers liquid under pressure through pipe 8, the circulation of the liquid taking place in the direction of the arrows. Due to the pressure increase in said pipe 8, piston 16 is moved toward the left and through rod 21 and plate 23 it causes the volume received on every revolution by pump 1 acting as a hydraulic motor to decrease. This tends to accelerate shaft 3, and consequently engine 2, which then supplies a higher braking torque.

It will be noted that springs 17 and 18 may be different so as to produce a different regulation of machine 1 according as to whether machine 4 is working as a pump or as a motor.

What has been told concerning the regulation of pump 1 applies to the regulation of motor 4, but the flow rate per revolution of this machine 4 varies in inverse ratio to the flow rate per revolution of machine 1, all other things being equal.

In a general manner, while the above description discloses what are deemed to be practical and efficient embodiments of the invention, said invention is not limited thereto as there might be changes made in the arrangement, disposition and form of the parts without departing from the principle of the invention as comprehended within the scope of the appended claims.

What we claim is:

1. In a system comprising an internal combustion engine and a part to be driven by said engine, the combination of a hydraulic transmission comprising two hydraulic machines, one mechanically coupled with said engine and the other with said part, respectively, two pipes each connecting the output of one of said machines with the input of the other, respectively, so as to form a closed circuit wherein one of said machines works as a pump and the other as a hydraulic motor, movable means for continuously varying the flow rate per revolution of at least one of said machines, two continuously movable members each operatively connected in a unidirectional manner with said means for the control thereof, two means for transmitting the pressures in said pipes to said members, respectively, in the direction that varies said flow rate in response to an increase of the pressure in the corresponding pipe, so as to reduce the ratio to each other of the respective flow rates per revolution of said pump and of said motor, and resilient means operatively connected with said members for acting thereon in opposition to said pressure operative means.

2. In a system comprising an internal combustion engine and a part to be driven by said engine, the combination of a hydraulic transmission comprising two hydraulic machines, one mechanically coupled with said engine and the other with said part, respectively, two pipes each connecting the output of one of said machines with the input of the other, respectively, so as to form a closed circuit wherein one of said machines works as a pump and the other as a hydraulic motor, movable means for continuously varying the flow rate per revolution of one of said machines, a movable plate operatively connected with said means for control thereof, two parallel cylinders communicating at respective ends thereof with said pipes respectively, two pistons movable in said cylinders respectively, two piston rods rigid with said pistons respectively and projecting slidably from the other ends of said cylinders respectively, said piston rods bearing resiliently against said plate to vary said flow rate in response to an increase of the pressure in the corresponding pipe, so as to reduce the ratio to each other of the respective flow rates per revolution of said pump and of said motor, and resilient means operatively connected with said pistons for acting thereon in opposition to said pressures in said pipes.

References Cited by the Examiner

UNITED STATES PATENTS

| 2,984,985 | 5/61 | MacMillin | 60—52 X |
| 3,003,309 | 10/61 | Bowers | 60—53 X |
| 3,053,043 | 9/62 | Knowler | 60—52 X |

FOREIGN PATENTS

| 412,816 | 3/22 | Germany. |

JULIUS E. WEST, *Primary Examiner.*

EDGAR W. GEOGHEGAN, *Examiner.*